Feb. 17, 1953 A. F. HICKMAN 2,628,870
THRUST BEARING

Original Filed May 23, 1946 2 SHEETS—SHEET 1

INVENTOR.
Albert F. Hickman
BY
Popp and Sommer
ATTORNEYS.

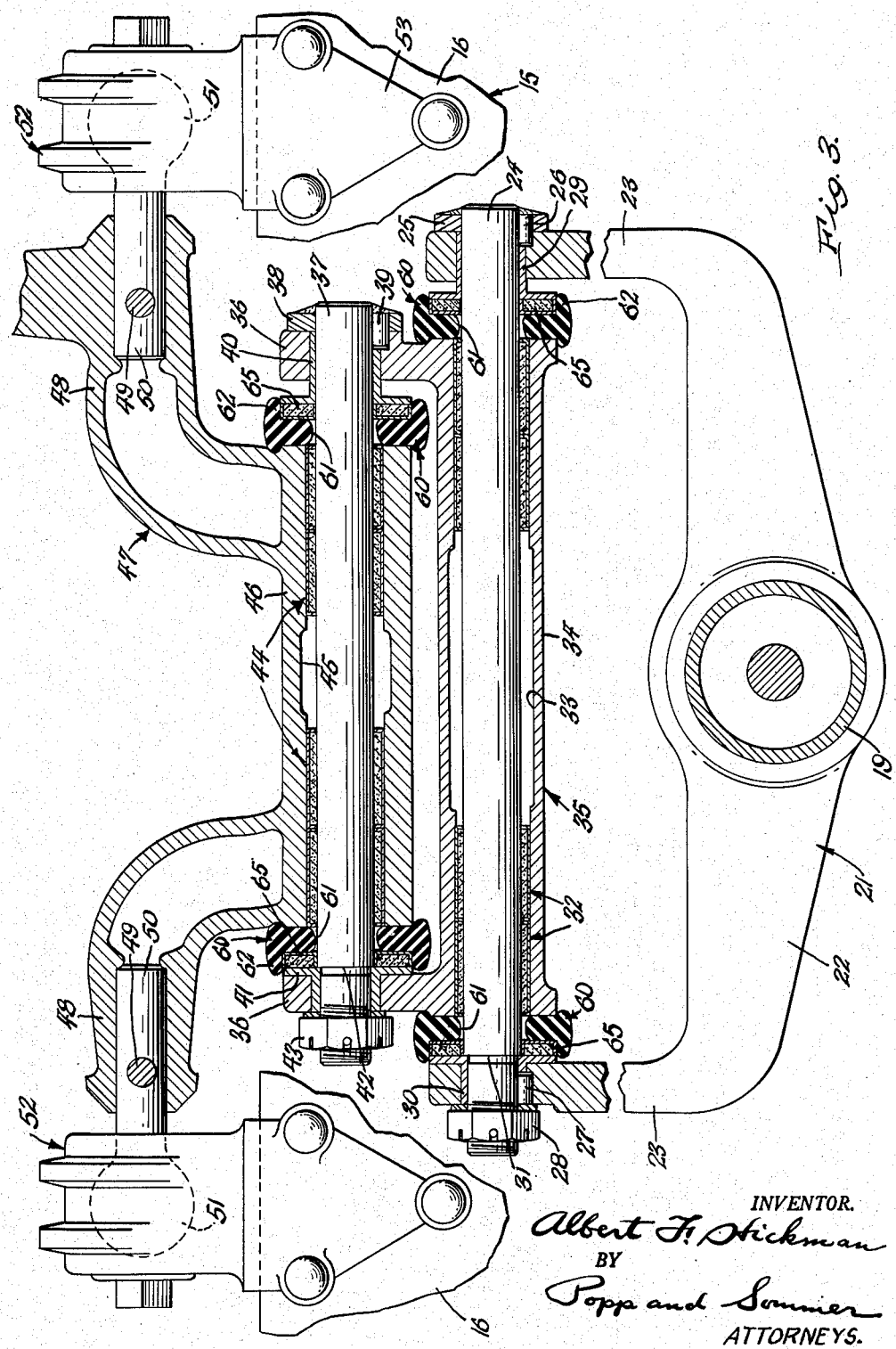

Patented Feb. 17, 1953

2,628,870

UNITED STATES PATENT OFFICE 2,628,870

THRUST BEARING

Albert F. Hickman, Eden, N. Y., assignor to Hickman Industries Inc., Eden, N. Y., a corporation of New York Original application May 23, 1946, Serial No. 671,869, now Patent No. 2,542,026, dated February 20, 1951. Divided and this application February 19, 1951, Serial No. 211,603

1 Claim. (Cl. 308—163)

This invention relates to a thrust bearing adapted for use in a torsion rod spring suspension and more particularly to such a thrust bearing for a torsion rod spring suspension in which a dirt seal, shock absorber and automatic bearing adjuster are combined.

This application is a division of my copending application, Serial No. 671,869, filed May 23, 1946, now Patent No. 2,542,026, dated February 20, 1951, for Torsion Rod Spring Suspension for Vehicles.

One of the principal objects of the present invention is to provide a combined dirt seal, shock absorber and automatic bearing adjuster for each of the bearings between the axle and body of the vehicle.

Another object is to provide a thrust bearing which can easily be assembled and reassembled.

Another object is to provide a thrust bearing which will stand up under conditions of severe and constant use with very little servicing.

Other objects and advantages will be readily apparent from the following description and drawings in which:

Fig. 3 is a fragmentary enlarged laid out section of axle bracket, shackle structure and crank arm connecting each end of the rear axle with the frame of the vehicle shown in Fig. 2.

The main frame 15 of the vehicle chassis is shown as constituted of the usual pair of longitudinal horizontal side frame bars in the form of inwardly facing channels 16 which are connected by cross bars 18. The entire vehicle chassis, together with its rear wheel spring suspension, is constructed substantially symmetrically about a vertical longitudinal medial plane, and hence it is deemed sufficient to confine the following description to the one (left) side of the rear portion of the vehicle, it being understood that this description applies to the opposite (right) side of the vehicle.

Figure 1:
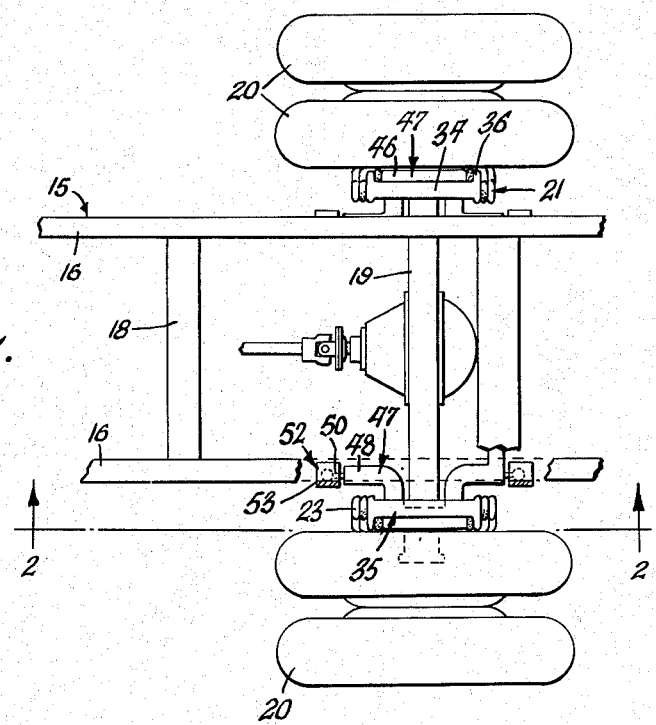
Fig. 1 is a fragmentary top plan view of the rear end of the frame of a vehicle supported on the rear axle by a torsion rod spring suspension having a thrust bearing embodying my invention.
Figure 2:
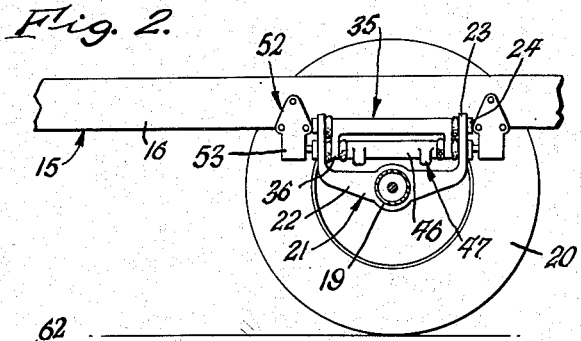
Fig. 2 is a fragmentary vertical sectional view thereof, taken generally on line 2—2, Fig. 1.

The rear end of the chassis frame 15 is supported by a drive axle housing 19 in turn supported by dual wheels 20 at its opposite ends. As best shown in Figs. 2 and 3 a U-shaped axle bracket 21 is fast to each end of the axle housing 19, this axle bracket having horizontal arms 22 extending fore and aft of the rear axle housing and having upwardly extending extremities 23. These brackets are fixed to the axle housing 19 immediately inside of the drive wheels 20 and, these extremities slant inwardly or toward the side bars 16 of the chassis frame instead of being vertically disposed.

The upwardly extending arms or extremities 23 of each axle bracket 21 carry an axle pivot pin 24 which, as best shown in Fig. 3, has a head 25 at one end on which is welded a pin 26, this pin projecting into a groove in the adjacent axle bracket arm 23 and to prevent the axle pivot pin 24 from turning. A loose pin 27 can be provided between the opposite end of the axle pivot pin 24 and the opposite arm 23 of the axle bracket to prevent relative rotation of these parts and the axle pivot pin can be retained in position by a nut 28 threaded thereon. The headed end of the axle pivot pin 24 can be mounted in the corresponding arm 23 of the axle bracket 21 through a sleeve or bushing 29 having a radial enlargement at its inner end to provide a thrust bearing face, the thrust against this enlargement being transmitted to the head 25 of the axle pivot pin. The opposite end of the axle pivot pin is carried by a sleeve or bushing 30 having a radial enlargement at its inner end to provide a thrust bearing face, this enlargement being disposed in engagement with the adjacent arm 23 of the axle bracket 21. The threaded end of the axle pivot pin 24 which carries the nut 28 is reduced to provide an annular shoulder 31 bearing against the thrust bushing or collar 30.

Each axle pivot pin 24 carries a plurality of bearing bushings 32, each preferably being made of lubricant impregnated material held in a cylindrical metal shell. These bearing bushings are fitted in the opposite end of the bore 33 through the tubular cross part 34 of the shackle structure 35. Shackle arms 36 are integrally formed with the opposite ends of the tubular cross part 34 of the shackle structure and the opposite ends of these shackle arms carry a crank arm pivot pin 37. One end of this crank arm pivot pin 37 is provided with a head 38 in which is welded a pin 39 fitting in a groove provided in the adjacent shackle arm 36 so as to prevent the crank arm pivot pin from turning. The headed end of the crank arm pivot pin 37 is mounted in the arm through a sleeve or bushing 40, this being similar to the sleeve or bushing 29 and having a radial enlargement at its inner end to provide a thrust bearing face, the thrust against this enlargement being transmitted to the head 38 of the crank arm pivot pin. The opposite end of this crank arm pivot pin 37 is carried by a sleeve or bushing 41 having a radial enlargement at its inner end to provide a thrust bearing face, this enlargement being disposed in engagement with the adjacent shackle arm 36. The adjacent end of the crank arm pivot pin 37 is reduced to provide an annular shoulder 42 bearing against the thrust bushing or collar 41 and is threaded to receive a nut 43 which bears, through a suitable lock washer, against the outer face of the adjacent shackle arm 36.

The crank arm pivot pin 37 carries a plurality of bearing bushings 44, these bearing bushings preferably being identical with the bearing bushings 32 and being made of a lubricant impregnated material contained within a cylindrical metal shell. These bearing bushings 44 are fitted in the opposite ends of a bore 45 through the cylindrical offset portion 46 of the crank arm indicated generally at 47. While this crank arm can be made of welded tubing, it is shown as being in the form of a tubular forging or casting.

In each of these coaxial fulcrum ends 48 of the crank arm 47 is pinned, as indicated at 49, the stem 50 of a ball 51, and held in position by nuts (not shown). Each of these ball and socket bearings, indicated generally at 52, includes a housing or casing 53 which can be secured to the side bar 16 of the chassis frame in any suitable manner.

Figure 4:
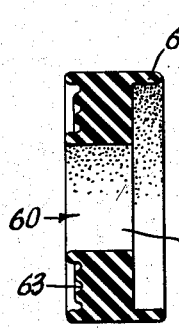
Fig. 4 is a radial section through one of the combined dirt seal, shock absorber and automatic bearing adjuster forming part of the rear wheel suspension, this part being designated at 60.

A feature of the invention resides in the form and mounting for the combined rubber dirt seal shock absorber and automatic bearing adapter illustrated in Fig. 4. This is in the form of a ring 60 of rubber or like soft, resilient plastic material and having a concentric bore 61 somewhat larger than the enlarged parts of each axle pivot pin 24 and crank arm pivot pin 37. At one side this ring is provided with an axially extending peripheral flange 62 and its opposite side is provided with a series of concentric annular grooves or flutes 63. One of these rings 60, as best shown in Fig. 3, is fitted over each end of each axle pivot pin 24 and crank arm pivot pin 37 and is interposed between the tubular housing for this pin and an adjacent thrust bearing 65, each of these thrust bearings being disposed against the face of the radial enlargement of the corresponding thrust sleeve 29, 30, 40, 41. The flanges 62 of these rubber rings 60 extend over these thrust bearings to provide dust seal therefor and the body of these rings are compressed between these bearings and the adjacent ends of the tubular housings for the pins 24 and 37.

A further feature of the invention resides in the use of the combined dirt seal, shock absorber and friction regulator or automatic bearing adjuster shown in Fig. 4 in the manner shown in Fig. 3 and which also allows the shackle bolts and nuts to be tightened to a predetermined metal-to-metal stop with reasonably broad machine tolerances for all metal parts.

In acting as a dirt seal, since the rubber is molded with the flutes 63 on one or both sides, a low initial rate of compression is established for any direction. After the flutes 63 have flattened out the compression rate jumps very high. This jump in the compression rate insures maintaining the dust seals at both ends of the pins 24 and 37 when the assembly is subjected to end thrusts. Thus when a heavy thrust load is applied to the rubber seal 60 at one end of the assembly, the opposite rubber seal 60 must expand a sufficient amount to insure against any opening from the pin bearings to the atmosphere. This expansion is insured by the high rate of compression encountered in the compressed rubber seal after its flutes have been flattened out.

Another important advantage of the flutes 63 on the rubber disks 60 is in the fact that rubber, especially the present synthetic rubbers, takes a permanent set over a period of years of 40% or more. The flutes permit the assembly of the suspension with sufficient precompression on the rubber disks 60 to anticipate the permanent set and also to withstand the brake thrust reactions without heavy static thrust loads on the end bearings. The fluted design of the disks 60 makes the unit foolproof in assembly or reassembly because it is merely necessary to tighten the nuts of the shackle pins 24, 37 to a dead stop after which they are locked in place by the cotter pins.

In acting as shock absorbers, because of the precompression of the disks 60 a predetermined pressure is at all times imposed between the thrust bearings for the shackle pins 24, 37 and the shackle and axle brackets, respectively. Any substantial degree of rotation of the shackle bracket is thereby resisted by the friction imposed by the rubber disks 60. On the other hand with slight vibrations or movements of the shackle structures the rubber disks 60 will flex torsionally around the shackle pins before the resistance of the rubber is sufficient to cause action of the friction thrust bearings. By this means the vehicle is resiliently free from friction for the small irregularities in the road to provide a friction free boulevard ride, and at the same time the rubber disks 60 act to check frictionally movements caused by large irregularities.

From the foregoing it will be seen that the present invention provides a unique combined rubber dirt seal, shock absorber and automatic bearing adjuster for each of the bearings between the axle and body of the vehicle in a torsion rod spring suspension.

I claim:

In a vehicle spring suspension for connecting the frame and wheeled axle of a vehicle, a thrust bearing for a pin journalled in one part with its opposite ends projecting therefrom and said opposite ends being secured to another part, comprising an annular thrust bearing disk surrounding each projecting end of said pin and interposed between said parts and having bearing engagement with a thrust bearing face on said another part, an apertured rubber disk surrounding each end of said pin and compressed between said annular thrust disk and said one part and an annular peripherial flange integral with said rubber disk and extending axially to embrace and provide a dirt seal for said thrust bearing disk.

ALBERT F. HICKMAN.

REFERENCES CITED

The following references are of record in the file of this patent:

UNITED STATES PATENTS

| Number | Name | Date |
|---|---|---|
| 2,087,543 | Nallinger | July 20, 1937 |
| 2,328,868 | Weiss | Sept. 7, 1943 |
| 2,344,983 | Fageol | Mar. 28, 1944 |
| 2,481,430 | Koller | Sept. 6, 1949 |

FOREIGN PATENTS

| Number | Country | Date |
|---|---|---|
| 741,746 | France | Dec. 13, 1932 |